Nov. 27, 1956 R. F. JOHNSON 2,772,007
VEHICLE MOUNTED BALE LOADER
Filed June 28, 1954 2 Sheets-Sheet 1
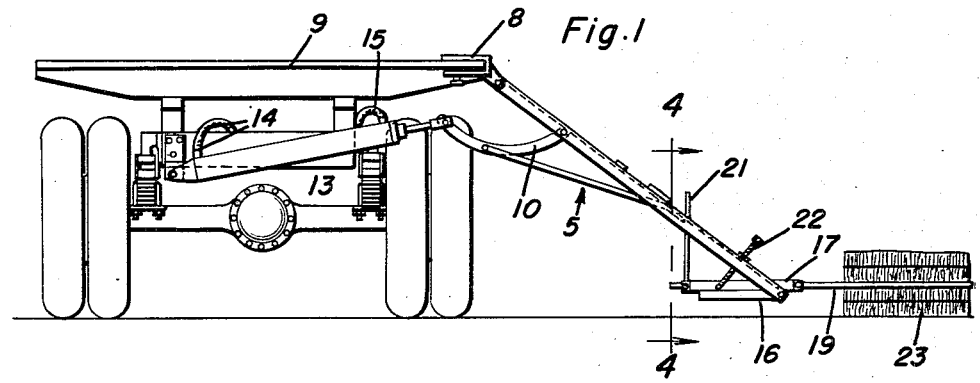
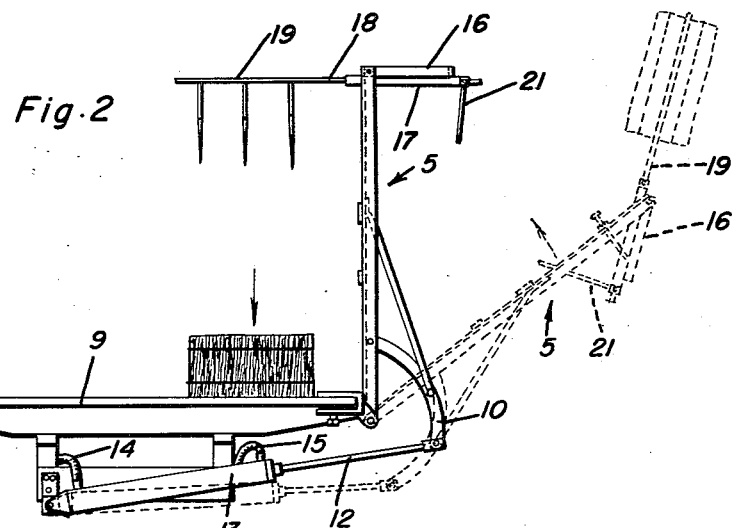
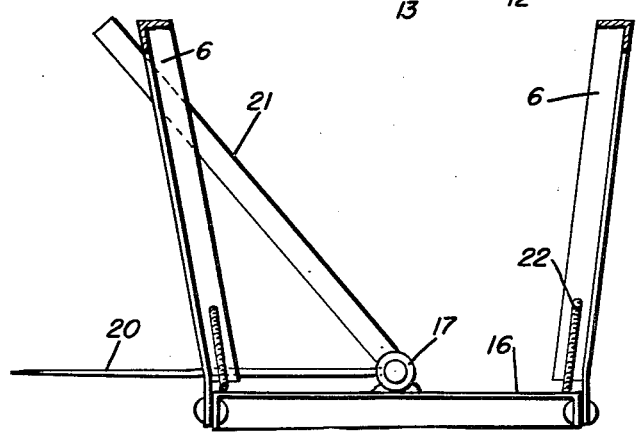
Reuben F. Johnson
INVENTOR.

Nov. 27, 1956   R. F. JOHNSON   2,772,007
VEHICLE MOUNTED BALE LOADER
Filed June 28, 1954   2 Sheets-Sheet 2
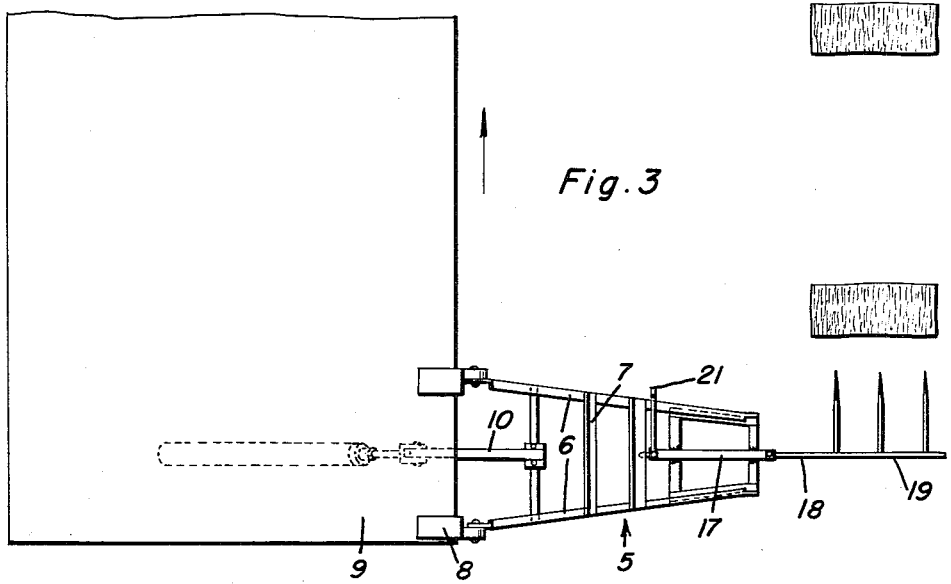
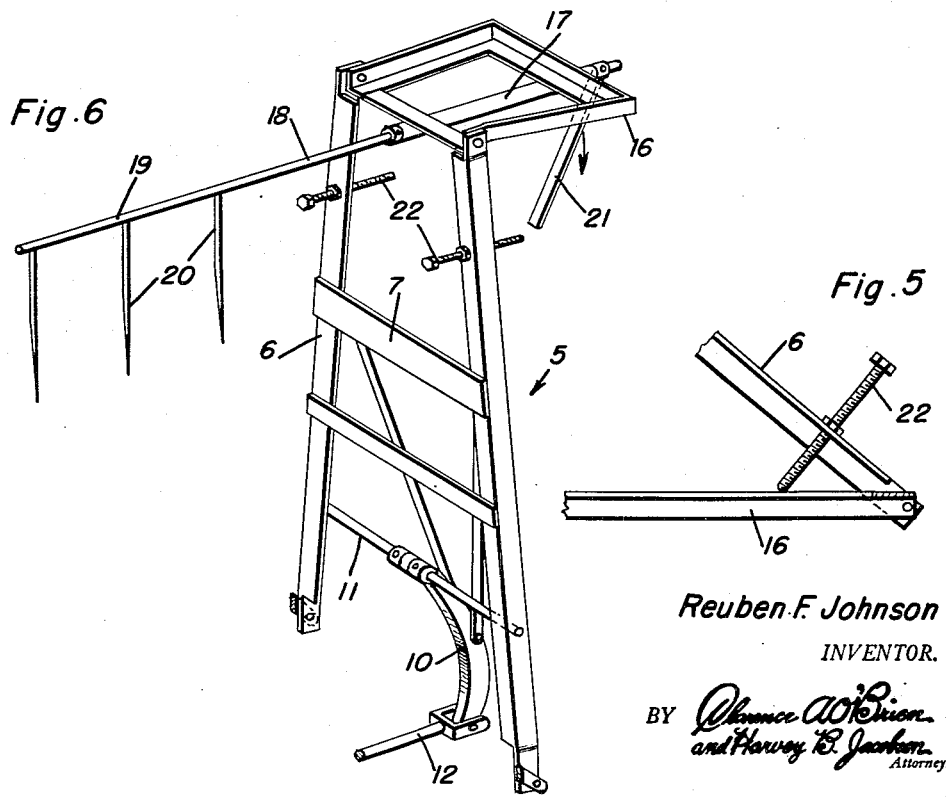
Reuben F. Johnson
INVENTOR.

United States Patent Office 2,772,007
Patented Nov. 27, 1956

2,772,007
VEHICLE MOUNTED BALE LOADER

Reuben F. Johnson, Kensington, Minn.

Application June 28, 1954, Serial No. 439,597

6 Claims. (Cl. 214—80)

The present invention relates to new and useful improvements in loading devices for loading bales of hay or the like onto a truck, trailer or other vehicle during uninterrupted movement thereof over a field.

An important object of the invention is to provide a vertically swingable forwardly projecting lifting fork attached to the side of a vehicle to automatically penetrate a bale of hay positioned on the ground in the path of forward movement of the fork and to turn the fork by the weight of the load as it is raised so that the bale will drop therefrom by gravity onto the vehicle.

Another object is to provide a self-operating bale pick-up and loading fork at the outer end of a vertically swingable beam or frame supported in an outwardly projecting position at the side of a vehicle, and wherein the fork automatically assumes a forwardly facing position when the beam is lowered to penetrate the bale and turns into a downwardly facing position to permit the bale to slide off the fork when the beam is raised.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view showing the beam in lowered pick-up position;

Figure 2 is a rear elevational view showing the beam in raised position;

Figure 3 is a top plan view;

Figure 4 is an enlarged sectional view taken on a line 4—4 of Figure 1;

Figure 5 is an enlarged fragmentary side elevational view of the adjustable stop for holding the fork in horizontal pick-up position; and Figure 6 is an enlarged perspective view of the vertically swingable beam and fork in loading position.

Referring now to the drawings in detail, wherein for the purpose of illustration I have disclosed a preferred embodiment of my invention, the numeral 5 designates a beam or frame composed of a pair of longitudinal arms 6 rigidly connected to each other by cross bars 7 and of angle iron or other suitable structural formation. The inner ends of the arms are pivoted to clamps or brackets 8 which are secured to the side of a truck body 9 to support the frame in an outwardly projecting position at the side of the truck and for swinging vertically thereon.

An arcuate arm 10 is secured at one end to a cross bar 11 adjacent the inner end of the frame and extends inwardly under the frame and braced against the latter and the inner end of the arm is pivoted to the outer end of a piston rod 12 which is slidable in a cylinder 13 positioned transversely under the truck and pivoted at its rear end thereto for vertical swinging movement of the cylinder. Hose lines 14 and 15 connect the cylinder to a suitable supply of fluid pressure to actuate the piston rod in an inward and outward movement in the usual manner to raise and lower frame 5.

An outer frame 16 is pivoted at two of its corners to the outer ends of arms 6 for vertical swinging movement independent of frame 5 and a sleeve 17 is welded or otherwise suitably secured in a longitudinal position to the outer frame. A shaft 18 is rotatably mounted in the sleeve and projects outwardly at each end thereof. The outer end of the shaft is provided with a fork 19 having tines 20 extending at right angles to the shaft. The position of the shaft 18 in the sleeve 17 prevents the shaft 18 from dropping downwardly about its pivot. An arm 21 is secured to the inner end of the shaft and enters between the arms 6 of frame 5, when the frame 5 is in a lowered position and with frame 16 underlying frame 5, as shown in Figure 1. Arm 21 is secured at a predetermined angle on the shaft to rest against one of the arms 6 and to support the fork 19 in a forwardly projecting position. The weight of the fork causes the same to swing downwardly and to swing frame 16 upwardly under frame 5 and screw threaded stops 22 are adjustably carried by the arms 6 adjacent the outer ends of the latter and are engaged by frame 16 to hold the shaft 18 for the fork in a horizontal position.

In the operation of the device, the piston rod 12 is retracted in cylinder 13 to lower frame 5, whereupon fork 19 is free to swing downwardly into a horizontal position, as shown in Figure 1. As the vehicle 9 moves forwardly the tines 20 of the fork will penetrate into a bale of hay 23 which lies on the ground in the path of movement of the fork and fluid pressure is then supplied to cylinder 13 to force piston rod 12 outwardly and raise frame 5. As frame 5 swings upwardly the bale is lifted in the manner indicated by dotted lines in Figure 2 until the frame 5 approaches its perpendicular position and at which time the bale passes the center of the pivot of frame 16 whereupon the bale will swing inwardly toward the vehicle and swing the frame 16 outwardly to release arm 21 from arm 6 of the frame and permit shaft 18 to turn on its axis by the weight of the bale to face the fork 19 downwardly. The bale will then slide off the tines of the fork and be deposited onto the truck.

The release of the weight of the load from the fork will permit frame 16 to swing downwardly from the load delivery position as shown in Figure 6 and to again enter the arm 21 between the arms 6 of frame 5 and the forwardly inclined angle of arm 21, as the frame 5 is lowered will counterbalance the weight of the tines 20 and rotate shaft 18 in sleeve 17 in a direction to again face the fork forwardly for repeating the loading operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A bale loader comprising a vehicle attached vertically swingable member and adapted for raising from an outwardly projecting position at one side of the vehicle into a substantially perpendicular position, a shaft having a fork at one end with the tines thereof extending at right angles to the shaft, means rotatably and swingably attaching the shaft to the outer end of said member for vertical swinging movement independently of the latter, and means carried by the shaft and engaging a relatively stationary structure when the member is in a lowered position for holding the shaft from rotation with the fork in a forwardly facing bale penetrating position, and said last named means being disengaged from said structure upon a predetermined raising movement of the member to release the shaft for turning movement by the weight of the load on the tines to face the fork downwardly for depositing the load.

2. A bale loader comprising a vehicle attached vertically swingable beam projecting outwardly at one side of the vehicle, a bale pick-up fork including a shaft and tines projecting at right angles to the shaft, means at the outer end of the beam rotatably supporting the shaft and with the fork in a forwardly facing position and adapted to penetrate a bale during forward movement of the vehicle and while the bale is resting on the ground, or automatic fork actuating means turning the shaft to face the fork downwardly upon a predetermined raising movement of the beam to deposit the bale on the vehicle.

3. A bale loader comprising a vehicle attached vertically swingable beam projecting outwardly at one side of the vehicle, a vertically swingable member supported at the outer end of the beam, a fork rotatably mounted on said member and projecting outwardly beyond said member and said fork counterbalancing said member to maintain the fork in a horizontal position when the beam is lowered, said fork including forwardly facing tines adapted to penetrate into a bale during forward movement of the vehicle and while the bale is resting on the ground, and an arm carried by the fork and engaging the beam to hold the fork in a bale penetrating position, said vertically swingable member releasing the arm from the beam to free the fork for turning on its axis into a downwardly facing position upon a predetermined raising movement of the beam.

4. The combination of claim 3 and fluid pressure actuating means connected to the beam for raising and lowering the same.

5. The combination of claim 3 and including an adjustable stop between the beam and the vertically swingable member to adjust counterbalancing movement of the fork.

6. A bale loader comprising a ground engaging vehicle having attached thereto a vertically swingable member at the side thereof, a fork having tines, and means attaching the fork to the outer end of said member for swinging movement independently of the member from a forwardly facing bale penetrating position with said tines extending substantially parallel to the ground, when the member is in a lowered position, into a downwardly facing bale depositing position when the member is raised.

References Cited in the file of this patent
UNITED STATES PATENTS

| | | |
|---|---|---|
| 1,019,344 | Myers | Mar. 5, 1912 |
| 1,327,834 | Long | Jan. 13, 1920 |
| 2,441,591 | Owen | May 18, 1948 |
| 2,531,070 | McDermott | Nov. 21, 1950 |
| 2,634,003 | Williamson et al. | Apr. 7, 1953 |
| 2,699,876 | Smith | Jan. 18, 1955 |

FOREIGN PATENTS

| | | |
|---|---|---|
| 696,060 | France | Oct. 7, 1930 |